Patented June 9, 1925.

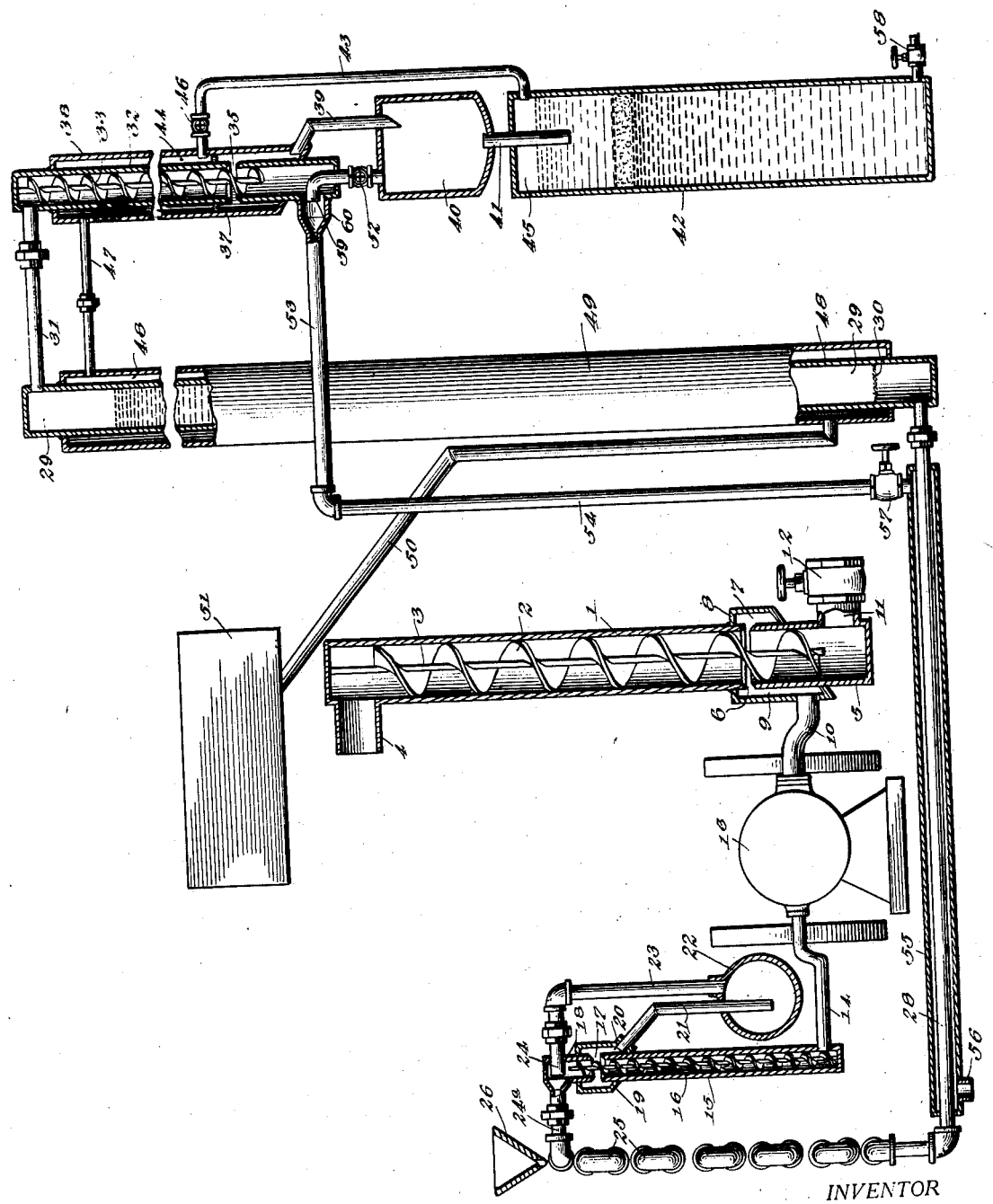

1,540,963

UNITED STATES PATENT OFFICE.

CHARLES F. W. TABLER, OF TAMPICO, MEXICO.

PROCESS FOR SEPARATING GAS FROM LIQUIDS.

Application filed March 26, 1924. Serial No. 702,117.

*To all whom it may concern:*

Be it known that I, CHARLES F. W. TABLER, a citizen of the United States, and a resident of Tampico, Mexico, have invented certain new and useful Improvements in a Process for Separating Gas from Liquids, of which the following is a specification.

This invention relates to a process for separating fluids of a high specific gravity from fluids of a lower specific gravity when said fluids are mechanically mixed and which are ordinarily difficult of separation.

An object of the invention is the provision of a process for treating very lean natural gases either from stills or from the casing heads of oil wells and in which a refrigerating effect of the gasoline vapors is employed for cooling the fluid during a step in the treatment when the vapors which have been under considerable pressure are expanded in chambers adjacent the conduits through which the fluids have previously passed.

A further object of the invention is the provision of a process in which a step comprises simultaneously cooling and centrifugally separating fluids of different specific gravities.

A still further object of the invention is the provision of a process of utilizing the refrigerating effect of expanding vapors of a lighter hydrocarbon for chilling and thus retarding the progress of the heavier portions of the fluid principally gasoline passing through the system for extracting gasoline.

Another object of the invention is the provision of a process for not only extracting the heavier hydrocarbon from the lighter hydrocarbon but for eliminating impurities such as sulphur crude oil and other cooling matter by centrifugal force and by washing with water slightly charged with hydrocarbon.

This invention will be best understood from a consideration of the following detailed description, in view of the accompanying drawing forming a part of the specification; nevertheless it is to be understood that the invention is not confined to the disclosure, being susceptible of such changes and modifications which shall define no material departure from the salient features of the invention as expressed in the appended claims.

The figure discloses more or less diagrammatically an apparatus for carrying out the process according to the principles of my invention.

In carrying out this process it is necessary to first pass the lean gas through a centrifugal concentrator under its initial or delivery pressure of 20 lbs. or more. This concentrates the heavy constituents of the gas such as gasoline vapors and their impurities, i. e., crude oil, gas, oil, dust, etc., and delivers them to a compressor for further treatment, while the main portion or waste gases are discharged at this time.

The valuable gases and their heavy impurities leave the compressor at a pressure of 120 lbs. enter a second but much smaller centrifugal separator where they are freed of their heavy discoloring matter. The clean vapors are then cooled to substantially atmospheric temperature and the resulting gasoline, water and remaining vapors are passed through a vertical column containing refrigerated water. At a point where these substances pass through the water they are broken up into minute particles by means of a screen. From the vertical refrigerated washer the remaining liquids and vapor are again passed through a vertical separator of long construction, but this time for further coolings, absorption and agitation with the self-contained water, in order to precipitate the traces of sulphur still left in the gasoline. A large amount of the remaining vapors are absorbed by the cold gasoline against which the heavier of the remaining gases are pressed on their journey around the spirals. In this separator the liquids and precipitates formed are finally separated from the remaining gases. As the liquids and gases pass through the vertical washing column and final separator they are cooled by the liquid gasoline being allowed to expand in chambers enclosing said separator and washer.

I wish to state at this point that the utilization of the refrigerant produced by the expanding gasoline from pressure for cooling and aiding in the absorption of gasoline from its vapors; also the centrifugal concentration of gasoline vapors in lean gases are important features in this process.

Referring more particularly to the drawings, 1 designates a vertical drum in which is placed a spiral 2 supported at its center by a rod 3 and has its peripherally curved edge in close contact or secured to the inner side walls of the drum 1. An inlet pipe 4 is adapted to be connected to a pipe line from the casing head of an oil well or from the piping connected with a natural gas well or the drum 1 may be connected to the piping from a still.

Spaced from the lower end of the drum 1 is a pipe or drum 5 of the same diameter as the drum 1 to form a peripheral outlet 6 for the lower end of the centrifugal separator in the drum 1. This peripheral outlet opens into a chamber 7 formed by welding or securing in any approved manner a sleeve 8 of larger diameter than the drum 1 in such a manner that the upper end of the sleeve is closed and secured to the drum 1 while the lower end of said sleeve is secured in close relation to the drum 5. The bottom of the chamber 7 is higher at one end than its other end where the outlet 9 is disposed in order to drain the centrifugally separated fluids and foreign matter into a pipe 10. The lower end of the drum 5 has a discharge outlet 11 which is controlled by a valve 12. The dry gas is permitted to escape from the outlet 11 in quantities which is regulated by the valve 12. The dry gas discharge from the outlet 11 is utilized around the oil plant.

The pipe 10 leads directly to the intake of a compressor 13 so that the pipe 10 is a suction pipe and the vapors are forced outwardly through the discharge pipe 14 at no more than 120 pounds of pressure. The vapors under pressure are forced through a second centrifugal separator of less capacity than separator 2 and in the shape of a drum 15 having a spiral 16 which causes a rotary motion of the gases, rich gasoline vapors and foreign matter, and such foreign matter is thrown outwardly towards the walls of the drum 15 and escape between the annular opening 17 formed by spacing the upper end of the drum 15 from the lower end of the pipe 18.

A casing 19 is secured to and embraces the adjacent end of the pipe 18 and the drum 15 forming a chamber 20 which collects the discoloring matter which has been thrown out centrifugally by the separator 16. This matter passes through the pipe 21 which is connected with an opening adjacent the tilted bottom of the casing 19 with the pipe emptying into a reservoir 22. The upper end of the reservoir is connected by a pipe 23 with the pipe or drum 18 and any gases and vapors which have passed through the pipe 21 into the reservoir 22 escape through the pipe 23 and issue from the nozzle 24 into the outlet of the pipe or drum 18 and where said outlet is connected to cooling coils 25. The aspirating effect of the vapors passing upwardly through the center of the separator 15 and a slight difference in pressure between the reservoir 22 and chamber 18, aids in drawing the vapors and gases from the reservoir 22. The pressure in reservoir 22 is slightly greater than in chamber 18.

The coils 25 are cooled by water being sprayed from a trough 26 located directly above the coils. The water is collected in a trough 27 below the coils and carried away from the plant. The vapors and gases in the coils 25 are cooled to substantially atmospheric temperature and then pass through a pipe 28 to the bottom of a stand pipe 29 which is filled substantially with water. The vapors must pass through a fine mesh screen 30 formed at the bottom of the stand pipe 29 whereby they are broken up into minute particles so that the vapors will be thoroughly washed as they reach the top and are discharged through the connection 31 to a third centrifugal separator in the drum 32. The pressure of the vapors against the head of water in the stand pipe 29 is sufficient to maintain the water in said pipe. Some sulphur is precipitated by the washing in stand pipe 29 before entering the last centrifugal separator.

The drum 32 contains a spiral track 33 which causes the gases to be carried downwardly to the lower end of the drum where said drum is spaced from a second drum 34 of like diameter to provide an annular port 35 for permitting the condensed vapors which contain gasoline, excess water and precipitated sulphur, to pass into a chamber 36 formed by providing a partition 37 between the walls of the drum 32 and an embracing drum 38.

The bottom of the chamber 35 is inclined and at its lower end is provided with an opening embraced by the inner end of a discharge conduit 39. This conduit permits the gasoline, precipitated sulphur and water to pass into a chamber 40 having an outlet pipe 41 projecting into a storage tank 42. This storage tank, because of the accumulation of the water which is condensed from the gas and the vapors collecting in said reservoir, must be emptied at least every eight hours or otherwise the water would fill in and back up into the gasoline discharge pipe 43 and into the refrigerating chamber 44 between the outer drum 38 and the inner drum 32.

Floating upon the top of the water collected in the tank 42 is found the remaining impurities in the form of sulphur compounds and gasoline above the impurities in the space designated by the numeral 45. This gasoline is still under a pressure of 120 pounds and as the gasoline gradually fills into the top of the tank, it rises in the pipe 43 and is admitted to the chamber 44 through the opening of an expansion valve 46. When the gasoline under pressure is admitted to the chamber 44 it is permitted to expand and due to its expansion reduces the temperature to such an extent that the vapors passing through the drum 32 are chilled and the condensed gasoline and impurities collect upon the inner walls of the drum 32 and are carried downwardly and discharged through the annular opening 35 into the chamber 36. The vapors and gases passing through the drum 32 are exposed to the cold centrifugally separate portions on the cold walls of the separator in the drum 32.

The gasoline then passes through a connection 47 into the chamber 48 formed between the stand pipe 29 and the embracing drum 49 where it is employed for chilling the water in the stand pipe 29. A pipe 50 connected with the chamber 48 carries the gasoline to a storage tank 51 located at any convenient point.

The chamber 40 has a valve connection 52 with the lower end of the drum 32 where the lower end of said drum is connected with a discharge conduit 53. The small quantity of the remaining dry gases from the drum 32 pass through the conduit 53 through the conduit 54 to a casing 55 which embraces the pipe 28. The gases expanding in the casing 55 aid in further cooling the vapors and gases after they have left the cooling coils 25. The final waste gases are discharged through the outlet 56 and such gases are carried to any convenient point for utilization as by burning in the furnaces or for heating boilers for the generation of steam.

A valve 57 formed in the pipe line 54 where said pipe is connected with the casing 55 is adapted to control the said pressure or rather maintain the pressure in the pipe 54 and in all the sections of the system preceding said conduit. When the valve 57 is opened the gases under pressure are allowed to expand in the casing 55 and thereby aid in reducing the temperature of the vapors passing through the conduit 28.

It must be borne in mind that it is desirable to provide a rotary motion in order to cause the centrifugal action to discharge at all times in each separator the heavier hydrocarbons or condensed hydrocarbons and impurities along the walls of the drums enclosing the separator, but it is especially desirous to form the spirals in such a manner as to avoid any eddying currents, otherwise the centrifugal separation will not be properly effected.

The process set forth in the apparatus just described is adapted to be substituted for the use of the well known absorption plants which are employed for the purpose of removing gasoline from natural gases or the casing head gas and which gases are usually lean in gasoline content.

In the centrifugal separator within the drum 32 the final separation, and condensation of the gasoline vapors is had. It is at this point that any gasoline vapors still contained in the limited quantity of gases passing through such separator come into contact with the chilling surfaces of the drum 32 and as they are rotated under pressure in immediate contact with the cold surface of the drum and also the cold liquids on the walls of the separator, all the gasoline that remains in the vapors is removed and discharged into the chamber 40.

I claim:—

1. A process for extracting gasoline from gases, which comprises centrifugally separating and eliminating the greater and dry portion from the heavier portions carried by said gases under low pressure, increasing the pressure of the concentrated gases and again centrifugally separating and eliminating discoloring matter from the gases, washing and cooling said gases, further chilling said concentrated gases while centrifugally separating the gasoline and foreign matter from the remaining gases, expanding the separated gasoline for chilling the concentrated gases and gasoline when being washed and during the final stages of the centrifugal separation of the gasoline from said gases.

2. A process for extracting gasoline from gases, by placing the gases under pressure, forcing the gases under pressure through a stationary spiral path for separating and eliminating a greater portion of the gases from the heavier gases, forcing the concentrated portions through a second spiral path for separating discoloring matter from the gases, cooling the same under pressure, washing and chilling the concentrated portion, further chilling said portions while forcing same under pressure through a vertical column of chilled water to a further chilled centrifugal absorbing agitator and separator, expanding the separated gasoline for causing refrigeration of the concentrated vapors while being washed and forced through the last spiral path.

3. A process for extracting gasoline from gases which comprises placing the gases under pressure, whereby the heavier portion of the gases are concentrated by elimination of the lighter portions, removing discoloring matter from the concentrated portions of the gases, further compressing the concentrated gases and simultaneously cooling, agitating in chilled water and forcing same through further chilled absorber with spiral path where they are separated from the produced gasoline and water.

4. A process for extracting gasoline from gases, which comprises forcing the gases under pressure through a long drum having a suitable spiral path telescoped within the drum and centrifugally separating the heavier portions from said gases expanding the produced gasoline under pressure in close association with the concentrated gases in order to chill and condense said gases.

5. A process for concentrating gasoline from gases which comprises forcing the gases under pressure through a continuous spiral path for centrifugally separating the greater and dry portion of the gases from the heavier and wet portion of the gases, increasing the pressure of the wet portion, cooling, washing, chilling and agitating same with the self-contained water from steam vapors in a spiral agitator, separating the produced gasoline from the remaining gases, allowing said gasoline under pressure to expand in the cooling jacket of said spiraled agitator and absorber, for chilling the wet gases under treatment.

6. A process for extracting gasoline from gases which comprises forcing the gases under their natural pressure through a centrifugal concentrator in order to concentrate the small and rich portion of the gases, centrifugally removing the discoloring matter from this small and concentrated portion of gases under the same initial pressure cooling, washing in chilled column of water, further chilling the concentrated portions by passing the same through the spiral path and absorber, separating the liquid gasoline and allowing same to expand in cooling jackets in close association with the spiral path and water column, allowing dry portions of the gases still under initial pressure to expand for cooling the concentrated gases during the process.

7. A process for extracting gasoline from gases which comprises passing the gases under their low delivery pressure through a spiral path to concentrate the small and rich portion of the gases, eliminating the greater and dry portion of the gases, further compressing the small, concentrated portion of gases, removing discoloring matter centrifugally, cooling, washing in chilled water, further chilling in centrifugal agitating absorber and separating the gasoline under pressure, allowing said gasoline to expand in close association with the centrifugal agitating absorber and chilled water column respectively for causing refrigeration of the concentrated gases in said units and allowing the remainder of the small portions of gases still under pressure to expand for cooling the concentrated portions on their way to the absorber and column of water.

CHARLES F. W. TABLER.